United States Patent [19]

Bartek et al.

[11] Patent Number: 4,770,765

[45] Date of Patent: Sep. 13, 1988

[54] HYDROCARBON CRACKING PROCESS AND CATALYST FOR USE IN SAME

[75] Inventors: Robert Bartek, Sykesville; Gerald M. Woltermann, Westminster, both of Md.

[73] Assignee: Katalistiks International, Inc., Baltimore, Md.

[21] Appl. No.: 73,147

[22] Filed: Jul. 14, 1987

[51] Int. Cl.$^4$ ............................................. C10G 11/18
[52] U.S. Cl. ................................. 208/113; 208/52 CT; 208/120; 208/121; 208/149; 502/521; 502/525
[58] Field of Search ................... 208/52 CT, 113, 120, 208/121, 122, 149; 502/521, 524, 525

[56] References Cited

U.S. PATENT DOCUMENTS

| | | | |
|---|---|---|---|
| 4,179,409 | 12/1979 | Gladrow et al. | 502/525 |
| 4,411,772 | 10/1983 | Schucker et al. | 208/121 |
| 4,414,099 | 11/1983 | Schucker et al. | 208/121 |
| 4,446,011 | 5/1984 | Wheelock et al. | 208/121 |
| 4,451,355 | 5/1984 | Mitchell et al. | 502/525 |
| 4,452,693 | 6/1984 | Schucker et al. | 208/121 |
| 4,466,884 | 8/1984 | Occelli et al. | 208/113 |
| 4,492,678 | 1/1985 | Yoo et al. | 502/524 |
| 4,504,381 | 3/1985 | Bertsch | 208/52 CT |
| 4,520,120 | 5/1985 | Mitchell et al. | 502/525 |
| 4,522,706 | 6/1985 | Wheelock et al. | 208/121 |
| 4,601,815 | 7/1986 | Forester et al. | 208/52 CT |
| 4,613,428 | 9/1986 | Edison | 208/113 |

*Primary Examiner*—Anthony McFarlane
*Attorney, Agent, or Firm*—Vincent J. Vasta, Jr.

[57] ABSTRACT

In a catalytic cracking process which includes contacting a hydrocarbon feedstock in a contacting zone in the presence of solid composition containing molecular sieve-containing catalyst capable of promoting hydrocarbon cracking at conditions effective to crack the hydrocarbon feedstock to lower boiling components, the improvement comprising conducting the contacting in the presence of at least one metal component, other than the catalyst, containing calcium and tin. A composition of matter comprising such catalyst and metal component is also disclosed.

12 Claims, No Drawings

HYDROCARBON CRACKING PROCESS AND CATALYST FOR USE IN SAME

FIELD OF THE INVENTION

This invention relates to a hydrocarbon cracking process and to a catalyst composition suitable for use in such a process. More particularly, the invention relates to a hydrocarbon cracking process using a molecular sieve-containing catalyst involving one or more of certain defined metal components useful to reduce the deleterious effect of contaminating metals, e.g., present in the hydrocarbon feedstock.

BACKGROUND OF THE INVENTION

Catalytic hydrocarbon cracking is a major process commercially practiced, e.g., by petroleum refiners, to produce gasoline and other relatively low boiling hydrocarbon products. Such cracking often occurs in the presence of solid particles containing zeolite-containing cracking catalyst. In most conventional catalytic cracking processes in which hydrocarbon feedstocks are cracked to produce gasoline and other light distillates, a gradual deterioration in the cracking ability or performance of the molecular sieve-containing catalyst occurs. At least a part of the deterioration is often attributable to the deposition on the solid particles of contaminant metal or metals from the feedstock. The deposition of these contaminants, which include nickel, vanadium and iron, tends to adversely affect the cracking process, for example, by decreasing gasoline production and undesirably increasing the yields of hydrogen and coke.

Vanadium is of particular concern since vanadium oxide or vanadia can penetrate the structure of the molecular sieve and interact to form low melting eutectics that lead to neutralization of acid sites and irreversible destruction of molecular sieve crystallinity, producing a less active, lower surface area amorphorous material.

A number of attempts have been made to mitigate against the deposition of such contaminant metals on solid cracking catalyst particles. For example, a number of U.S. patents to Phillips Petroleum Company disclose the use of antimony as a nickel passivation agent. Certain U.S. patents to Gulf Oil Corporation disclose the use of tin as a metals passivation agent. U.S. Pat. No. 4,451,355 to Gulf Oil Corporation discloses the use of calcium-titanium, calcium-zirconium and calcium titanium-zirconium oxides and mixtures thereof as additives for a catalyst useful for cracking a vanadium-containing hydrocarbonaceous oil. A large number of other passivating metal components have been suggested, for example, gallium, indium, zinc, tellurium, aluminum, cadmium and arsenic. See: U.S. Pat. Nos. 4,324,648; 4,348,273; 4,504,381; 4,415,440; 4,167,471; 4,363,720; 4,326,990; and 4,396,496.

The use of various barium compounds to passivate contaminating metals on hydrocarbon cracking catalysts is disclosed in U.S. Pat. Nos. 4,473,463; and 4,377,494. These patents teach that the useful barium compounds can be organic or inorganic, with oil or water soluble barium compounds being preferred. Suitable inorganic barium compounds include barium salts of mineral acids such as barium nitrate, barium sulfate, barium halides and barium oxyhalides; and basic barium compounds such as barium hydroxide, barium hydrosulfide and barium carbonate. European patent publication No. 0 194 536 discloses the use of barium titanium oxide, in particular barium titanate, in combination with zeolitic molecular sieve cracking catalyst for cracking metal-containing hydrocarbon feedstocks.

U.S. Pat. No. 4,432,890 discloses a number of metal additives for immobilizing vanadia on zeolite-containing cracking catalysts. Such metal additives include the following metals, their oxide and salts and their organo-metallic compounds: Mg, Ca, Sr, Ba, Sc, Y, La, Ti, Zn, Hf, Nb, Ta, Mn, Fe, In, Tl, Bi Te, the rare earths, and the actinide and lanthanide series of elements. This patent recognizes that mixtures of these additive metals, other than the Group IIA or alkaline earth metals, e.g., Mg, Ca, Sr and Ba, with vanadia may occur to form high melting ternary, quaternary or higher component reaction mixtures, such as vanadium titanium zirconate ($VO-TiO_2-ZiO_2$). This patent also states that although Group IIA metals and other metals are capable of tying up vanadia in high melting immobile materials, such as $Ba_3VTi_2O_9$, $BaO-K_2O-TiO_2-V_2O_4$, and $BaO-Na_2O-TiO_2-V_2O_5$, those metals may result in excessive neutralization of acidic sites on the catalyst and generally are not used as metal additives for immobilizing vanadia on zeolite-containing cracking catalysts.

However, there continues to be a need for metals, in particular vanadium, passivating agents for zeolite-containing cracking catalyst.

The following additional U.S. Pat. Nos. were reviewed during the preparation of this application: 3,446,730; 4,450,241; 4,425,259; 4,412,914; 4,149,998; 4,418,008; 4,089,810; 4,293,445; 3,360,330; and 3,317,439.

SUMMARY OF THE INVENTION

A new hydrocarbon catalytic cracking process has been discovered. The present process includes contacting a hydrocarbon feedstock, particularly a hydrocarbon feedstock containing a contaminating amount of metal, e.g., vanadium, nickel, iron and mixtures thereof, more particularly vanadium, in a contacting zone in the presence of solid composition, preferably solid particles, containing molecular sieve-containing catalyst capable of promoting hydrocarbon feedstock cracking. This contacting is conducted, preferably in the substantial absence of free molecular hydrogen, at conditions effective to crack the hydrocarbon feedstock to one or more lower boiling components. In the present invention, this contacting is very effectively conducted in the presence of at least one metal component, other than the catalyst, containing calcium and tin and preferably oxygen. In one embodiment, the metal component is present in an amount effective to reduce the deleterious effect of the contaminating metal or metals on the catalyst. The metal component may be combined with, e.g., incorporated into, the solid composition to form a new composition of matter.

The present invention provides substantial advantages. For example, the presently useful metal components have been found to be effective in reducing the damaging effect on molecular sieve-containing cracking catalyst caused by contaminating metals, in particular vanadium, which are often present in the hydrocarbon feedstock to be cracked. In many instances, these metal components are more effective in reducing these harmful effects than the calcium compounds disclosed in various patents, e.g., as discussed above. In addition, these metal components may be utilized without substantial adverse effect on the solid composition, the molecular sieve-containing catalyst and the hydrocarbon cracking operation. Also, the presently useful metal components are relatively inexpensive and can be utilized in a cost effective manner, e.g., to combat vanadium contamination.

DETAILED DISCUSSION OF THE INVENTION

The present calcium, tin-containing metal components are particularly effective when present during the feedstock/solid composition contacting in an amount effective to reduce the deleterious effect of the contaminating metal or metals, in particular vanadium, on the catalyst. The metal component may be present in separate particles from the catalyst-containing solid particles. However, it is preferred that the metal component be included in the solid particles. The metal component is preferably present in an amount in the range of about 0.1% to about 40%, more preferably to about 25%, by weight of the solid composition. Still more preferably, the metal component is present in an amount in the range of about 1% to about 20% by weight of the solid composition.

In one embodiment, the metal components preferably further contain or further comprise oxygen. In this embodiment, the metal components may be characterized as mixed metal oxides. The amount of oxygen included is preferably that needed to satisfy the stoichiometric requirements of the particular metal component or components being employed. The metal component is preferably substantially insoluble in water and in the hydrocarbon feedstock at ambient conditions, and more preferably at the conditions of the feedstock/solid composition contacting. One particularly useful metal component is calcium stannate.

The presently useful metal components can be prepared using conventional techniques. For example, one or more calcium compounds and one or more tin compounds can be combined and subjected to elevated temperatures, e.g., in the range of about 700° C. or about 800° C. to about 1200° C. or more, in air or other oxygen-containing gaseous medium for a period of time, e.g., in the range of about 1 hour to about 24 hours or more, to produce the metal components. The calcium and tin compounds preferred are the oxides and oxide precursors, i.e., compounds which form oxides at elevated temperatures with presence of an oxygen-containing gaseous medium. Calcium stannate can be prepared, for example, by firing calcium carbonate and stannic oxide at elevated temperatures, e.g., in the range of about 900° C. to about 1100° C. In the preparation, calcium carbonate and stannic oxide can be dry mixed prior to the firing step, which is conducted for a period of about 5 hours to about 20 hours.

The solid composition, e.g., solid particles, useful in the present invention contain one or more molecular sieves capable of promoting catalytic cracking of the hydrocarbon feedstock to one or more lower boiling products.

The molecular sieves useful in the present invention may be selected from zeolitic molecular sieves, or zeolites, and non-zeolitic molecular sieves, or NZMSs, and mixtures thereof, provided that such molecular sieves are capable of promoting hydrocarbon cracking.

Zeolites which can be employed in the practice of this invention include both natural and synthetic zeolites. These natural occurring zeolites include gmelinite, chabazite, dachiardite, clinoptilolite, faujasite, heulandite, analcite, levynite, erionite, sodalite, cancrinite, nepheline, lxzuite, scolecite, natrolite, offretite, mesolite, mordenite, brewsterite, ferrierite, and the like. Suitable synthetic zeolites which can be employed in the present process include zeolites X, Y, A, L, Zk-4, B, E, F, H, J, M, Q, T, W, Z, alpha, beta, omega, ZSM-types, ultrastable Y and the like. The synthetic zeolites are preferred, for example, because the chemical make up, physical structure and properties of such metals are more readily controlled relative to the naturally occurring zeolites.

Alkali metal, e.g., sodium, tends to reduce the catalytic effectiveness of the zeolite. Accordingly, most or substantially all of the alkali metal which may be present in the zeolite is preferably removed or replaced, e.g., with other metal cations such as calcium or aluminum ions or ions of the rare earth metals. Procedures for removing/replacing alkali metals and for putting the zeolite in an advantageous form for hydrocarbon cracking are known in the art. See, for example, U.S. Pat. Nos. 3,140,253 and RE. No. 27,659.

The presently useful NZMSs include molecular sieves embraced by an empirical chemical composition, on an anhydrous basis, expressed by the formula:

$$mR: (Q_wAl_xP_ySi_z)O_2 \qquad (1)$$

where "Q" represents at least one element present as a framework oxide unit "$QO_2^n$" with charge "n" where "n" may be −3, −2, −1, 0 or +1, "R" represents at least one organic templating agent present on the intracrystalline pore system; "m" represents the molar amount of "R" present per mole of $(Q_wAl_xP_ySi_z)O_2$ and has a value from zero to about 0.3; and "w", "x", "y" and "z" represent the mole fractions of $QO_2^n$, $AlO_2^{3^1}$;  $PO_2^-$, $SiO_2$, framework oxide units. "Q" is characterized as an element having a mean T"O" distance in tetrahedral oxide structures between about 1.51 Å and about 2.06 Å. "Q" has a cation electronegativity between about 125 kcal/g-atom to about 310 kcal/gm-atom and "Q" is capable of forming stable Q-O-P, Q-O-Al or Q-O-Q bonds in crystalline three dimensional oxide structures having a "Q-O" bond dissociation energy greater than about 59 kcl/g-atom at 298° K[1]; and "w", "x", "y" and "z" represent the mole fractions of "Q", aluminum, phosphorus and silicon, respectively, present as framework oxides said mole fractions being within the limiting compositional values or points as follows:

w is equal to 0 to 99 mole percent;
y is equal to 1 to 99 mole percent;
x is equal to 1 to 99 mole percent; and
z is equal to 0 to 99 mole percent. *

[1] See the discussion at pages 8a, 8b and 8c of EPC Publication No. 0 159 624, published Oct. 30, 1985, about the characterization of "EL" and "M". Such are equivalent to Q as used herein.

The "Q" of the "QAPSO" molecular sieves of formula (I) may be defined as representing at least one element capable of forming a framework tetrahedral oxide and may be one of the elements arsenic, beryllium, boron, chromium, cobalt, gallium, germanium, iron, lithium, magnesium, manganese, titanium vanadium and zinc. Combinations of the elements are contemplated as representing Q, and to the extent such combinations are present in the structure of a QAPSO they may be present in molar fractions of the component in the range of 1 to 99 percent thereof. It should be noted that formula (I) contemplates the non-existence of Q and Si. In such case, the operative structure is that of aluminophosphate or $AlPO_4$. Where z has a positive value, then the operative structure is that of silicoaluminophosphate or SAPO. Thus, the term QAPSO does not perforce represent that the elements Q and S (actually Si) are present. When Q is a multiplicity of elements, then to the extent the elements present are as herein contemplated, the operative structure is that of the ELAPSO's or ELAPO's or MeAPO's or MeAPSO's, as herein discussed. However, in the contemplation that molecular sieves of the QAPSO variety will be invented in which Q will be another element or elements, then it is the intention to embrace the same as a suitable molecular sieve for the practice of this invention.

Illustrations of QAPSO compositions and structures are the various compositions and structures set forth by Flanigen et al in a paper entitled, "Aluminophosphate Molecular Sieves and the Periodic Table," published in the "New Developments and Zeolite Science Technology" Proceedings of the 7th International Zeolite Conference, edited by Y. Murakami, A. Sijima and J. W. Ward, pages 103-112 (1986). Various of such compositions and structures are described in: (1) U.S. Pat. Nos. 4,567,029; 4,440,871; 4,500,651; 4,554,143; 4,310,440; and (2) European patent publication Nos. 0 159 624 published Oct. 30, 1985; 0 161 488 and 0 161 489 and 0 161 490 and 0 161 491 all published Nov. 21, 1985; 0 158 975 and 0 158 976 each published Oct. 23, 1985; and 0 158 348 and 0 158 350 each published Oct. 16, 1985.

The effective pore diameter of the presently useful molecular sieves is preferably in the range of about 6 angstroms to about 15 angstroms.

Compositions of the solid composition which are particularly useful in the present invention are those in which the molecular sieve is incorporated in an amount effective to promote the desired hydrocarbon cracking, e.g., a catalytically effective amount, into a porous matrix material which comprises, for example, amorphous material which may or may not be itself capable of promoting such hydrocarbon cracking. Included among such matrix materials are clays and amorphous compositions of alumina, silica, silica-alumina, magnesia, zirconia, mixtures of these and the like. The molecular sieve is preferably incorporated into the matrix material in amounts within the range of about 1% to about 75%, more preferably about 2% to about 50%, by weight of the total solid composition. Catalytically active molecular sieves which are formed during and/or as part of the methods of manufacturing the solid composition are within the scope of the present invention.

The form, e.g., particle size, of the present solid composition, is not critical to the present invention and may vary depending, for example, on the type of reaction-regeneration system employed. Such composition may be formed into any desired particles such as pills, cakes, extrudates, powders, granules, spheres and the like, using conventional methods. Where, for example, the final particles are designed for use as a fixed bed, the solid composition may preferably be formed into particles having a minimum dimension of at least about 0.01 inch and a maximum dimension of up to about one-half inch or one inch or more. Spherical particles having a diameter of about 0.03 inch to about 0.25 inch, preferably about 0.03 inch to about 0.15 inch, are often useful, especially in fixed bed or moving bed operations. With regard to fluidized bed systems, it is preferred that the major amount by weight of the solid particles have a diameter in the range of about 10 microns to about 250 microns, more preferably about 20 microns to about 150 microns.

The solid composition of the present invention can be prepared by any one of several conventional methods. One method comprises making a sol containing the matrix material and/or the precursor or precursors of such material and a separate aqueous slurry containing the molecular sieve component and the metal component. The slurry can be milled to achieve the desired particle size distribution. The sol and slurry are combined and mixed. The resulting mixture can be spray-dried and the resulting microspheres washed free of extraneous soluble salts using, for example, a dilute ammonium sulfate solution and water. Rare earth metal ions may be exchanged onto the microspheres. After such washing/ion exchange, the microspheres are calcined.

When the metal component is to be included in particles separate from the molecular sieve-containing particles, it is preferred that the metal component be combined with porous matrix material, e.g., as described above, to provide such separate particles. In one embodiment, the size and/or shape of the separate particles is substantially the same as the size and/or shape of the molecular sieve-containing particles. Preferably, the metal component comprises about 1% to about 75% by weight of such separate particles. The presently useful separate particles can be prepared using any one of several conventional techniques. For example, an aqueous slurry of the metal component can be milled to achieve the desired particle size distribution. This milled slurry is combined with an aqueous slurry containing the matrix material or materials. The milled slurry is then spray dried and the resulting microspheres are calcined.

The solid composition, e.g., solid particles, of the present invention is preferably employed in the cracking of hydrocarbon feedstocks to produce lower boiling products, e.g., gasoline and light distillate fractions. Often, the hydrocarbon feedstock comprises a gas oil fraction, e.g., derived from petroleum, shale oil, tar sand oil, coal and the like. Such feedstock may comprise a mixture of straight run, e.g., virgin, gas oil. Such gas oil fractions often boil primarily in the range of about 400° F. to about 1000° F. Other hydrocarbon feedstocks, e.g., naphtha, high boiling or heavy fractions of petroleum, petroleum residuum, shale oil, tar sand oil, coal and the like, may be cracked using the catalyst and method of the present invention. Such hydrocarbon feedstocks often contain minor amounts of other elements, e.g., sulfur, nitrogen, oxygen and the like.

The present process and composition are particularly effective in converting hydrocarbon feedstocks containing contaminating amounts of at least one metal selected from the group consisting of vanadium, nickel, iron and mixtures thereof, in particular vanadium. Hydrocarbon feedstocks which include vanadium in an amount in the range of about 10 ppm to about 30,000 ppm or more by weight, calculated as elemental vanadium, can be effectively processed. Preferably, the catalyst-containing solid particles contain less than about 2%, more preferably about 1% or less, by weight of vanadium, calculated on an elemental basis.

Hydrocarbon cracking conditions are well known and often include temperatures in the range of about 850° F. to about 1100° F., preferably about 900° F. to about 1050° F. Other reaction conditions usually include pressures of up to about 100 psia. or more; catalyst to oil ratios of about 1 to 2 to about 25 to 1, preferably about 3 to 1 to about 15 to 1; and weight hourly space velocities (WHSV) of about 3 to about 60. These hydrocarbon cracking conditions may be varied depending, for example, on the feedstock and solid particles or combined particles being used, the reactor-regenerator system, e.g., fluid or moving bed catalytic cracking system, being employed, and the product or products wanted. The hydrocarbon feedstock/solid composition contacting preferably occurs in the substantial absence of added free molecular hydrogen.

In addition, the catalytic hydrocarbon cracking system includes a regeneration zone for restoring the catalytic activity of the solid composition previously used to promote hydrocarbon cracking. Carbonaceous deposit-containing solid composition from the reaction zone are contacted with free oxygen-containing gaseous medium in the regeneration zone at conditions to restore or maintain the activity of the catalyst by removing, i.e., combusting, at least a portion of the carbonaceous material from the solid composition. The conditions at which such free oxygen-containing gas contacting takes place may vary, for example, over conventional ranges. The temperature in the catalyst regeneration zone of a hydrocarbon cracking system is often in the range of about 900° F. to about 1500° F., preferably about 1100° F. to about 1350° F. and more preferably about 1100° F. to about 1300° F. Other conditions within such regeneration zone may include, for example, pressures up to about 100 psia. or more, and average catalyst contact times within the range of about 3 minutes to about 75 minutes. Sufficient oxygen is preferably present in the regeneration zone to completely combust the carbon and hydrogen of the carbonaceous deposit material, for example, to carbon dioxide and water. The amount of carbonaceous material deposited on the solid composition in the reaction zone is preferably in the range of about 0.005% to about 15%, more preferably about 0.1% to about 5% by weight of the solid composition.

The following non-limiting examples illustrate certain aspects and advantages of the present invention.

EXAMPLE 1

A composition used for testing was prepared as follows. A slurry of 465 grams of calcium stannate, 333 grams of amorphous alumina, 775 grams of sodium Y zeolite (on a silica/alumina basis) and 6200 grams of water was prepared. The slurry was sand milled to reduce particle size. 8850 grams of the milled slurry was mixed in a Cowles mixer with 5900 grams of a silica sol binder and 1741 grams of a 61% by weight kaolin clay/water slurry. This mixed slurry was then spray dried at a 325° F. outlet temperature.

A slurry containing 1000 grams of the spray dried microspheres (dry basis) and 4000 grams of water was pepared and collected on a Buchner funnel. The filter cake was then ion exchanged with 400 grams of ammonium sulfate in 4000 grams of water at 140° F., washed with 6000 grams of water, and ion exchanged with a solution containing 43.2 grams of a mixed rare earth chloride hydrate and 1528.8 grams of water. The cake was then washed with 4000 grams of water, oven dried at 212° F. and calcined at 1000° F. for one hour. Following calcination, the microspheres were re-exchanged with 133 grams of ammonium sulfate in 1330 grams of water, washed with 6000 grams of water and oven dried at 300° F. The final composition was microspheres containing 25% by weight of zeolite and 15% by weight of calcium stannate.

EXAMPLE 2

A composition used for testing was prepared as follows. A slurry containing 9400 grams of USY zeolite and 37,400 grams of water was prepared and sand milled to reduce particle size. A 24,000 gram portion of the milled slurry was mixed in a Cowles mixer with 9,000 grams of aqueous aluminum chlorhydrol solution (equivalent to 25% by weight of alumina), 3200 grams of dolomitic limestone ($CaCO_3$—$MgCO_3$) (sold by Davison under the tradename DVT), 16,400 grams of a 61% by weight kaolin clay/water slurry, 1,080 grams of mixed rare earth chloride hydrate and 720 grams of water. The mixture was spray dried at an outlet temperature of 350° F.

The resulting microspheres were calcined at 600° F. and 1,000 grams was washed with a solution containing 200 grams of ammonium sulfate in 2,000 grams of water, and additionally washed with 6,000 grams of water before being calcined again at 1,000° F. The final microspheres contained 20% by weight of zeolite and 15% by weight of dolomitic limestone.

EXAMPLE 3

Example 2 was repeated except that calcium titanate was used in place of dolomitic limestone. The final microspheres contained 20% by weight of zeolite and 15% by weight of calcium titanate.

EXAMPLE 4

Each of the compositions prepared in Examples 1 to 3 was impregnated with various levels of vanadium to artificially simulate the deposition of vanadium on cracking catalyst particles during hydrocarbon cracking operations. These impregnations were conducted using an industry accepted metal (vanadium) naphthanate technique described in an article by B. R. Mitchell in Ind. Eng. Chem. Prod. Res. Dev., 19 (1980) 209.

EXAMPLE 5

Each of the compositions prepared in Examples 1 to 3 and the vanadium impregnated compositions prepared in Example 4 was tested for hydrocarbon catalytic cracking performance using the standard microactivity test, or MAT (ASTM D3907-80). Prior to microactivity testing, the compositions were hydrothermally aged in a 100% steam environment for five (5) hours at 1,400° F. under normal MAT steamer dynamics. Hydrocarbon cracking performance was judged at 900° F. utilizing standard space velocities, catalyst/oil ratios, product identification and MAT chargestock. MAT results are shown in Tables 1 to 4.

TABLE 1

MAT RESULTS
Vanadium Level 0.0%

| Metal Component | Conversion, % | PRODUCT YIELDS, WT. % | | | | | | | | |
|---|---|---|---|---|---|---|---|---|---|---|
| | | Total $C_3$ | $C_3=$ | Total $C_4$ | $iC_4$ | $C_4=$ | Gasoline | LCO[1] | Coke | $H_2$ |
| $CaSnO_3$ | 81.6 | 4.7 | 2.9 | 9.6 | 6.0 | 2.1 | 59.9 | 14.6 | 5.9 | 0.10 |
| $CaCO_3$—$MgCO_3$ | 76.3 | 4.2 | 3.1 | 8.5 | 5.1 | 2.4 | 58.9 | 18.7 | 3.4 | 0.05 |
| $CaTiO_3$ | 75.4 | 4.1 | 3.3 | 9.3 | 4.7 | 3.8 | 58.4 | 19.4 | 3.0 | 0.04 |

[1]Light cycle oil

TABLE 2

MAT RESULTS
Vanadium Level 0.5%

| Metal Component | Conversion, % | PRODUCT YIELDS, WT. % | | | | | | | | |
|---|---|---|---|---|---|---|---|---|---|---|
| | | Total $C_3$ | $C_3=$ | Total $C_4$ | $iC_4$ | $C_4=$ | Gasoline | LCO[1] | Coke | $H_2$ |
| $CaSnO_3$ | 71.9 | 3.9 | 2.8 | 7.5 | 4.3 | 2.4 | 55.3 | 20.4 | 4.0 | 0.12 |
| $CaCO_3$—$MgCO_3$ | 71.4 | 3.7 | 2.8 | 7.8 | 4.1 | 2.9 | 55.4 | 21.1 | 3.2 | 0.23 |
| $CaTiO_3$ | 65.6 | 3.2 | 2.6 | 7.6 | 3.2 | 3.8 | 52.0 | 24.4 | 3.2 | 0.19 |

[1]Light cycle oil

TABLE 3

MAT RESULTS
Vanadium Level 1.0%

| Metal Component | Conversion, % | PRODUCT YIELDS, WT. % | | | | | | | | |
|---|---|---|---|---|---|---|---|---|---|---|
| | | Total $C_3$ | $C_3=$ | Total $C_4$ | $iC_4$ | $C_4=$ | Gasoline | LCO[1] | Coke | $H_2$ |
| $CaSnO_3$ | 69.4 | 3.6 | 2.7 | 7.2 | 3.8 | 2.6 | 54.0 | 22.1 | 3.7 | 0.14 |
| $CaCO_3$—$MgCO_3$ | 57.6 | 2.7 | 2.2 | 5.7 | 2.5 | 2.8 | 45.5 | 27.9 | 2.6 | 0.32 |
| $CaTiO_3$ | 61.0 | 2.2 | 1.7 | 4.6 | 2.1 | 2.2 | 50.0 | 27.5 | 3.5 | 0.21 |

[1]Light cycle oil

TABLE 4

MAT RESULTS
Vanadium Level 2.0%

| Metal Component | Conversion, % | PRODUCT YIELDS, WT. % | | | | | | | | |
|---|---|---|---|---|---|---|---|---|---|---|
| | | Total $C_3$ | $C_3=$ | Total $C_4$ | $iC_4$ | $C_4=$ | Gasoline | LCO[1] | Coke | $H_2$ |
| $CaSnO_3$ | 37.6 | 0.8 | 0.7 | 1.5 | 0.4 | 1.0 | 31.7 | 33.7 | 3.0 | 0.18 |
| $CaCO_3$—$MgCO_3$ | 12.4 | 0.5 | 0.4 | 0.7 | 0.1 | 0.5 | 7.3 | 36.0 | 2.9 | 0.38 |
| $CaTiO_3$ | 56.4 | 2.1 | 1.7 | 4.9 | 2.0 | 2.6 | 46.5 | 29.8 | 3.7 | 0.25 |

[1]Light cycle oil

These results indicate that calcium stannate is effective to reduce the deleterious effect of vanadium on a molecular sieve-containing catalytic cracking catalyst composition. Calcium stannate is particularly effective in situations where the vanadium content of the catalyst composition is less than 2% by weight. For example, calcium stannate surprisingly performs as well as or better than calcium titanate at such catalyst vanadium concentrations. In short, materials which include calcium and tin are unexpectedly effective in reducing the deleterious effect of vanadium on molecular sieve-containing cracking catalysts.

While the present invention has been described with respect to various specific examples and embodiments, it is to be understood that the present invention is not limited thereto and that it can be variously practiced within the scope of the following claims.

What is claimed is:

1. In a catalytic cracking process which includes contacting a hydrocarbon feedstock in a contacting zone in the presence of solid composition containing molecular sieve-containing catalyst capable of promoting cracking said hydrocarbon feedstock at conditions effective to crack said hydrocarbon feedstock to one or more lower boiling components, the improvement comprising: conducting said contacting in the presence of at least one metal component, other than said catalyst, comprising calcium stannate.

2. The process of claim 1 wherein said feedstock includes an amount of at least one contaminating metal and said metal component is present in an amount effective to reduce the deleterious effect of said contaminating metal on said catalyst.

3. The process of claim 2 wherein said contaminating metal is vanadium.

4. The process of claim 1 wherein said metal component further contains oxygen.

5. The process of claim 1 wherein said metal component is present in an amount in the range of about 0.1% to about 25% by weight of said solid composition.

6. The process of claim 1 wherein said metal component is present in an amount in the range of about 1% to about 20% by weight of said solid composition.

7. The process of claim 1 wherein said catalyst is present in solid particles and said metal component is present in at least a portion of said solid particles.

8. The process of claim 1 wherein said catalyst is present in solid particles and said metal component is present separate from said solid particles.

9. The process of claim 1 wherein said contacting takes place with said solid composition in the form of solid particles in the fluidized state.

10. The process of claim 1 wherein said solid particles are periodically contacted with an oxygen-containing gaseous medium to remove at least a portion of the carbonaceous deposit material formed during said feedstock/solid composition contacting.

11. The process of claim 11 wherein said periodic contacting takes place in the presence of said metal component.

12. The process of claim 2 wherein said solid composition is periodically contacted with an oxygen-containing gaseous medium to remove at least a portion of the carbonaceous deposit material formed during said feedstock/solid composition contacting and said periodic contacting takes place in the presence of said metal component.

* * * * *